United States Patent [19]
Gill

[11] Patent Number: 4,464,957
[45] Date of Patent: Aug. 14, 1984

[54] FASTENER AND DRIVER COMBINATION

[75] Inventor: Peter J. Gill, Wolverhampton, England

[73] Assignee: GKN Screws & Fasteners Limited, Smethwick, England

[21] Appl. No.: 283,343

[22] Filed: Jul. 14, 1981

[30] Foreign Application Priority Data

Jul. 23, 1980 [GB] United Kingdom ............... 8024144

[51] Int. Cl.³ .................................... B25B 15/00
[52] U.S. Cl. ......................................... 81/460
[58] Field of Search ........................ 81/461, 460

[56] References Cited

U.S. PATENT DOCUMENTS 2,046,837 7/1936 Phillips ............................ 81/460
2,859,782 11/1958 Cummaro ....................... 81/460
3,575,080 4/1971 Hannay .......................... 81/460
3,658,105 4/1972 Burt et al. ...................... 81/460
4,228,723 10/1980 Cunningham .................. 81/460

FOREIGN PATENT DOCUMENTS 487293 10/1952 Canada ............................ 81/460
715163 9/1954 United Kingdom ............ 81/460

Primary Examiner—Frederick R. Schmidt
Assistant Examiner—J. T. Zatarga
Attorney, Agent, or Firm—Pennie & Edmonds

[57] ABSTRACT

A combination of a cruciform recess in a fastener and cruciform driver has driver wings 13 which are narrower than corresponding recess radial grooves 21 and has downwardly tapered grooves and wings such that driving engagement between driver and fastener takes place at the outer upper edges of the recess. There is a relative downward taper between the wing width and groove width and these widths are so selected that the lower ends of the wings are confined by and preferably wedge in the recesses.

2 Claims, 7 Drawing Figures

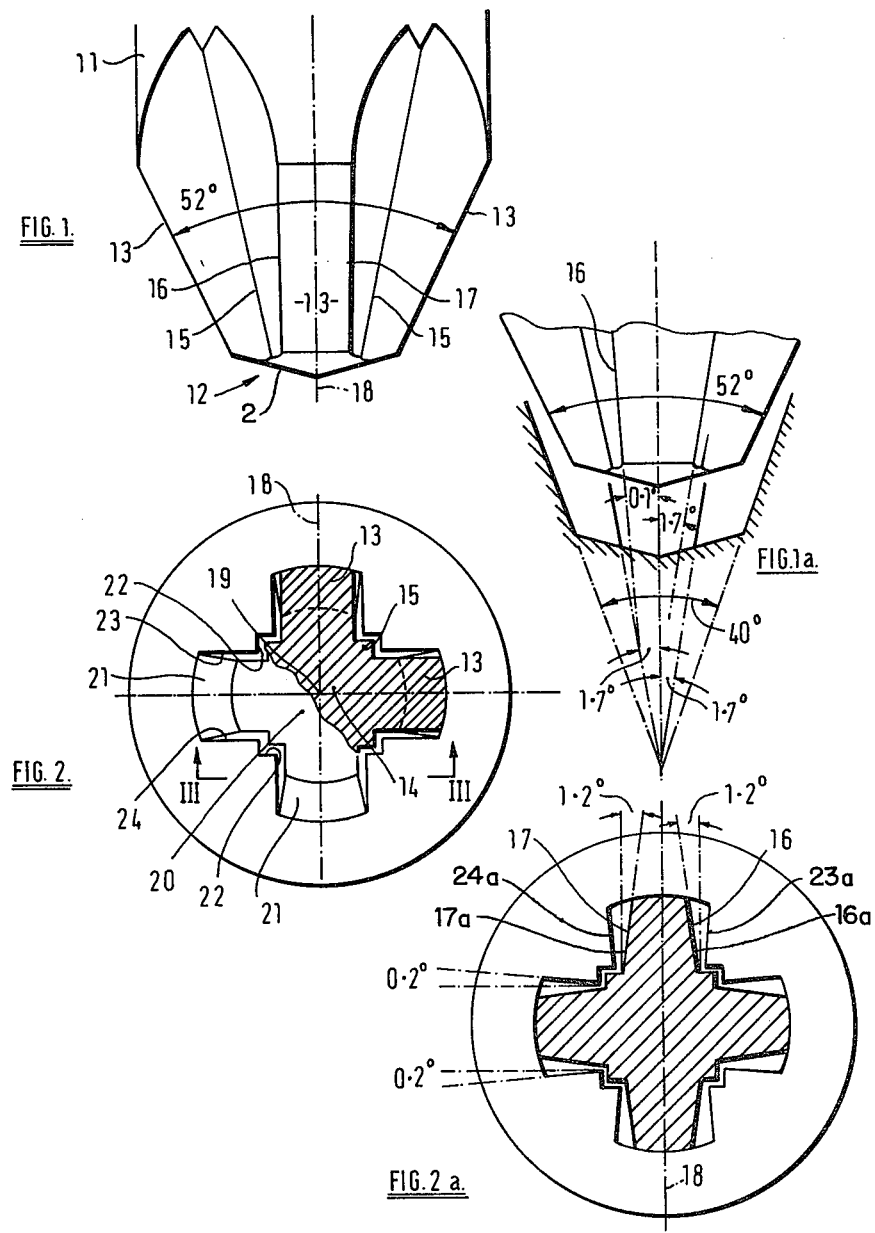

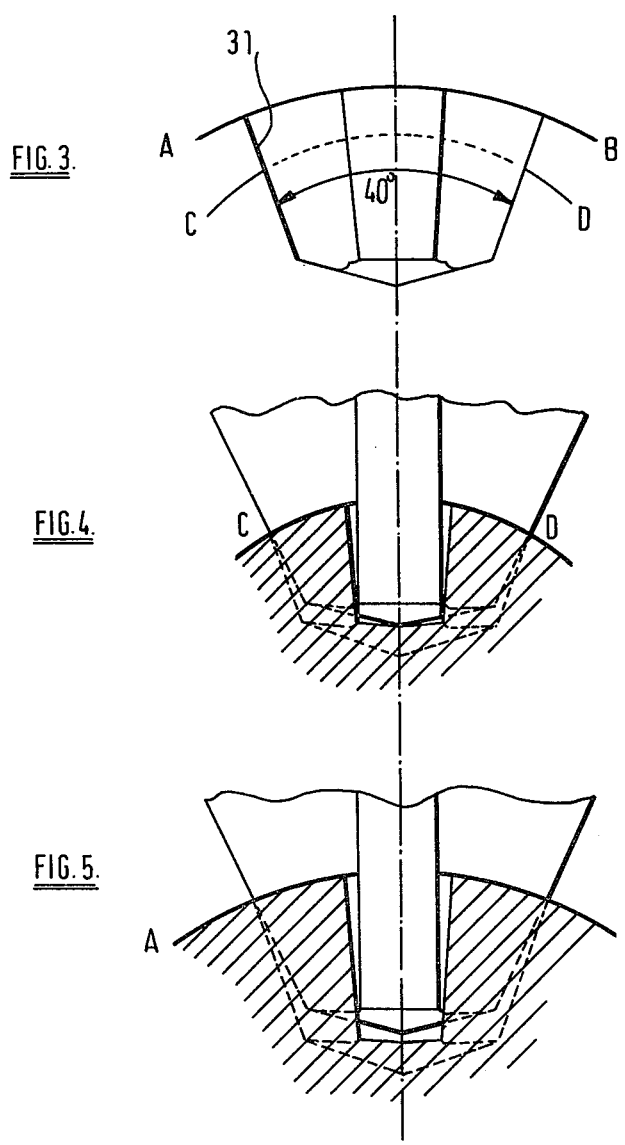

FASTENER AND DRIVER COMBINATION

BACKGROUND TO THE INVENTION

The invention relates to a combination of a rotatable fastener having a driving recess and a driver for engagement in the recess. The driver may have a conventional screw driver type handle or may be a driver bit for use in a power tool or in a screwdriver with interchangeable bits.

Throughout most of the 1970's extensive industrial use has been made of threaded fasteners incorporating cruciform recesses of the kind known by the registered trade mark POZIDRIV and as described in U.K. patent specification No. 1,006,509. These recesses were used in conjuction with a driver having a driving nib corresponding closely to the shape of the recess as described in the above mentioned patent specification and also known by the registered trade mark POZIDRIV.

This known recess has four grooves extending out from a central cavity with radial dimensions tapering towards the base of the recess. Similarly the driver has four radial wings projecting from a central core for driving engagement with the grooves and tapering in a radial dimensions towards the nose of the driver at an angle of taper equal to the taper of the grooves.

The detailed geometry of the POZIDRIV driver and recess combination is such that the driver is a wedge fit in the recess so that a screw can be carried on the end of a driver prior to engagement in a workpiece.

Use of POZIDRIV screws has now largely been replaced by use of screws of a kind known by the registered trade mark SUPADRIV as described in U.K. patent specification No. 1,521,141. Screws with SUPADRIV recesses are used with drivers corresponding generally to the older POZIDRIV design with a minor modification involving slight shortening of the nose of the driver. Such drivers will be referred to as shortened POZIDRIV drivers.

An important feature of the combination of a SUPADRIV recess with a shortened POZIDRIV driver is that the width of the wings of the driver at the upper edge of the recess when the driver is in driving engagement with the recess is less than the corresponding width of the grooves in the recess whereby the driver can move angularly about its axis in the recess to ensure driving contact between the driver and recess at the upper outer edges of the recess. The fact that the radial dimensions of the wings of the driver taper towards the nose of the driver at an angle of taper (an included angle of 52°) greater than the corresponding taper (an included angle of 40°) of the grooves of the recess, helps to ensure point driving contact between the driver and recess at the outer edges of the wings and the top edges of the grooves. This arrangement ensures a good driving connection between driver and screw which reduces the tendency for the driver to cam out of the recess against an applied axial load when torque is applied to the driver.

Another very useful feature of the combination of SUPADRIV recess and shortened POZIDRIV driver is that the driver can drive the screw effectively despite axial misalignment between screw and driver amounting to 5° or more. This advantage is particularly important in mass production applications involving use of a powered driver in a confined space. The effective angle drive is achieved primarily because the loose fit of the driver in the recess allows tilting of the driver axis with respect to the screw axis whilst maintaining full engagement between driver and recess.

However, a disadvantage of the combined SUPADRIV recess and shortened POZIDRIV driver in some applications is that the driver is not a wedge fit in the recess. This makes it difficult or in some cases impossible to mount the screw on the end of the driver prior to offering it up to a workpiece. An associated disadvantage of the system in some applications is that the driver-recess combination does not hold the screw in accurate axial alignment with the driver and so does not provide the necessary support for severe applications such as self tapping screws which also have to make their own hole.

An object of the invention is to provide an improved driver and fastener combination which incorporates many of the advantages of both the SUPADRIV and POZIDRIV systems.

SUMMARY OF THE INVENTION

According to the present invention there is provided in combination, a rotatable fastener having a driving recess and a driver for engagement in the recess, the recess having at least three radial grooves extending out from a central cavity and tapering towards the base of the recess and the driver having a like number of radial wings projecting from a central core for driving engagement with the grooves and tapering in radial dimensions towards a nose or end of the driver at an angle of taper not less than said taper of the grooves, the width of the wings at the upper edge of the recess when the driver is in driving engagement in the recess being less than the corresponding width of the grooves whereby the driver can move angularly about its axis in the recess to ensure driving contact between driver and recess at the upper outer edges of the sides of the grooves, wherein the width of the grooves tapers towards the base of the recess to such an extent that the nose or end ends of the wings of the driver are confined in the grooves to provide a stable engagement between driver and fastener.

Preferably the ends of the wings of the driver wedge in the grooves to provide a wedge engagement between driver and fastener. However, in view of the need to allow manufacturing tolerances and in the interests of providing common geometry for a range of recesses of different depth and a common driver for these recesses, a number of driverrecess combinations will have a slight clearance of up to 0.05 mm between the end of the wings and the groove. It has been found that a useful degree of stability can be achieved with such a clearance.

Preferably the recess has four equally spaced grooves and the driver correspondingly has four equally spaced wings. However, as an alternative, there could be three wings and grooves or a number greater than four could be employed.

Preferably the angle of taper towards the nose or end of the driver is such as to provide an included angle between the outer wing edges of 52° and preferably the corresponding angle of taper of the recess is between 40° and 45°.

Theoretically the confinement between the wings and the grooves at the nose of the driver should provide something of a rotational constriction of the driver in the recess, so preventing point contact between the outer edges of the wings and the upper edges of the sides of the grooves. However, due to flexibility of the driver, the fact that the confinement is at a small distance from the axis of the screw and the fact that in the case of a wedge fit any excess in the wing width over the groove width is small, effective point contact engagement does occur at the desired location. The confinement tends to hold the screw axis near to alignment with the driver axis, thus providing the positive guidance for the screw which is often required. Also, if the driver is not inserted fully into the recess, effective driving can still be achieved and in this case the drive can still take place through an angle. The cam-out resistance achieved by point contact between wings and grooves is still effective when the driver is not fully engaged in the recess and is driving at an angle. Thus, when inserting a screw close to an obstruction so that driving through an angle is required, this can be achieved provided the driver is withdrawn slightly from its lowermost position in the recess, such withdrawal allowing the driver to engage the screw at the necessary angle.

When there is no wedge action as such, but a small clearance between the nose ends of the wings and the corresponding grooves the application of torque to the driver positively holds the wings at an angle in the bases of the grooves and this tends to take up at least some of the clearance, improving stability while driving.

BRIEF DESCRIPTION OF THE DRAWINGS

An embodiment of the invention will now be described by way of example with reference to the accompanying drawings in which:

FIG. 1 is a side elevation of a driver for use in the present invention; FIG. 1a is a view corresponding to FIG. 1 with some angles exaggerated for the purposes of illustration, also showing the profile of a recess.

FIG. 2 is a plan view of a recess, showing a driver in cross section within the recess and FIG. 2a is a corresponding view with some angles exaggerated;

FIG 3. is an illustration of how one basic recess size can be used for a range of sizes of screw head; and FIG. 4 is a section on line III—III of FIG. 2;

FIG. 5 is a view corresponding to FIG. 4 but using a recess of the same nominal size recessed more deeply into a larger screw head.

DESCRIPTION OF PREFERRED EMBODIMENTS

The driver shown in FIG. 1 is a conventional driver as has been sold for many years under the registered trade mark POZIDRIV with the exception that the nose or end 2 of the driver has been shortened slightly. The driver has a shank 11 which terminates in a nib 12 which is formed to engage in a cruciform recess. The shank 11 may be secured to a conventional screwdriver handle or the shank may be hexagonal for engagement in a driving head of a power driver. In the latter case the driver could perhaps be described strictly as a driver bit but throughout this specification and the claims any reference to a driver is intended to include such reference to a driver bit.

Reference should be made to the cross section of the driver shown in FIGS. 2 and 2a as well as to FIGS. 1 and 1a to understand the nature of the driver. The driver nib incorporates four wings 13 which, as shown in FIG. 2, extend radially from a central core 14 at equally spaced angles around the core. Between each adjacent pair of wings 13 there is a rib 15 which is best seen in FIG. 2 and which tends to strengthen the driver by increasing the dimensions of the central core and increasing the size of the roots of the wings.

The driver is used primarily for tightening screws with right hand threads and the faces 16 of the wings which perform this driving function are known as driving faces. The opposite face 17 of each wing is known as the back face. The driving faces 16 and back faces 17 of each wing are approximately parallel to each other and to a radial plane 18 extending through the longitudinal axis 19 of the driver and the centre of of a wing 13. However, there are slight but important deviations from this parallel relationship. Some angles in the drawings have been exaggerated to illustrate these tapers. As illustrated in FIG. 1a, the driving face 16 tapers in a downward direction towards the plane 18 at an angle of 0.1°. The corresponding back face 17 also has a downward and inward taper and in this case the angle is 1.7°. As illustrated in FIG. 2a, both the driving face 16 and back face 17 taper in an outward direction torwards the plane 18 at an angle of 1.2°. Also as illustrated in FIGS. 1 and 1a, the outer edge faces of the wings 13 in a downward direction so that the total included angle between diametrically opposite outer edge faces is 52°.

The recess shown primarily in FIG. 2 but also in FIG. 4 has four radial grooves 21 radiating from a central cavity 20 at equally spaced angles around the periphery of the recess. Valleys 22 are provided at the junctions of adjacent radial grooves and these provide space with a clearance for the ribs 15 of the driver. The outer faces of the grooves 21 are tapered in a downward and inward direction at a total included angle of 40° measured in the same way as the 52° angle of the driver. Although 40° has been chosen in this example, the feature of fundamental importance for the present invention is that the included angle between diametrically opposite outer faces the recess should not be more than the angle between diametrically opposed outer edge faces of the driver. It is preferable to use an included angle in the range of 40° to 45° for the recess, that is substantially less than the included angle of the driver.

Each groove 21 has a driven face 23 for engagement with a driving face 16 of a driver, and a back face 24. As with the driving and back faces of the driver, the driven and back faces of the grooves of the recess are almost parallel with each other and with a central radial plane such as the plane 18. However, in a downward direction towards the bottom of the recess, the driven and back faces each taper inwardly at an angle of 1.7°. In plan, as illustrated clearly in FIG. 2a, there is a reverse taper in the outward direction so that the outer edges of the grooves are wider than the inner edges of the grooves. The angle of this reverse taper is 0.2° on each face.

In accordance with the invention, the relative width of the grooves and the wings have to be such that the lower part of the driver is confined by and preferably wedges in the lower part of the recess and specifically so that lower portions of the faces 16 and 17 wedge with lower portions of the faces 23 and 24 of the grooves of the recess. Once the basic angles of the faces have been selected, and a standard shortened POZIDRIV driver has been selected, it is a simple matter to select the appropriate width for a recess wing to just achieve wedging or a small clearance resulting in a confined fit at the correct depth of the driver in the recess.

It is common practice to match one size of driver against a large number of screw heads which use the same nominal size of recess as the driver. For example, the most common size of driver is known as a Number 2 size driver and Number 2 size recesses are used in a range of different screws. With POZIDRIV and SUPADRIV, the only difference between one recess and another when both are of the same nominal size, has been the depth of penetration of a tapered punch with a standard shape and size of nose into the recess. This results in the lower end of all recesses of the same nominal size being identical, the total width and the groove width at the upper end of the recess depending on the depth of the recess. However, with the present invention, the depth of penetration of the driver into the recess which is determined by interengagement of the top outer edge of the grooves engaging with the outer conical faces of the wings, depends on the maximun diameter of the recess at its upper edge and thus on the depth of penetration of a punch into the head of the screw when forming the recess. This is best illustrated by reference to FIG. 3. This shows the outline 31 of the outer edges of the wings of a punch for forming the grooves in a recess intersected by two curved lines AB and CD. These lines AB and CD represent the top surface of two screw heads into which the punch has been driven to different depths. In relation to surface AB, the punch has produced a deep recess and this is wider at its upper edge than the width of the top of the recess represented by CD. FIG. 4 illustrates the recess with top surface CD of FIG. 3 engaged by the driver of FIG. 1. Similarly FIG. 5 represents the recess in surface AB of FIG. 3 penetrated by the driver of FIG. 1. It is clear from a comparison of FIGS. 4 and 5 that the driver penetrates nearer to the bottom of the recess of FIG. 4 than that of FIG. 5.

This difference in depth of penetration causes some difficulty in achieving a wedging action for all recesses because of the constant width at the base for the grooves chosen for a range of recesses. If the recess width is selected to produce the appropriate wedge fit in FIG. 4, there is a small clearance in the arrangement of FIG. 5 at the depth of penetration achieved. However, it has been found that in practice, it is possible to achieve a compromise groove width at the base of the groove which in practice allows complete insertion of the driver and provides for all depths of penetration of the punch an appropriate confined fit with only a small clearance, typically 0.02 mm up to 0.05 mm. This compromise is assisted by the fact that the effective angle of taper producing a wedging action is only 1.6°. This wedging angle can be derived from the difference between the total taper in a vertical direction on the wing, namely 1.7° plus 0.1° and the total taper of the groove, namely 1.7° plus 1.7°. With this shallow wedging angle, and bearing in mind some flexibility in the materials employed, the wedging action does not occur simply at one single depth but wedging can be achieved over a small range of depths compatible with some of the different depths of recess of the same nominal size.

One further feature which assists in establishing wedging over a range of depths is that the wedging occurs only at the inner edges 16a and 17a of the wings and inner edges 23a and 24a of the grooves and not over the whole width of the wings or grooves. This can be seen from the fact that there is an effective taper in an outward direction between the wing and its groove amounting to 2.8°. This angle is the sum of the two 1.2° tapers on the wing and of the two reverse 0.2° tapers in each recess. Thus as the wedging takes place only at the inner edges of the wings and recesses, a smaller metal deformation is required to increase depth of penetration once wedging has been achieved and so to allow wedging over a range of depths than would be the case with full edge contact at the bottom of the wings.

This edge contact at the inner ends only of the the grooves and wings has the advantage that the wedging action does not produce an effective rotary driving connection between driver and recess at the bottom of the wing. This in turn allows the driver to twist through a small angle within the recess despite the wedging action until the outer edges of the driver come into contact with the upper outer edges of the sides of the grooves to produce point driving contact as described in greater detail in U.S. Pat. No. 1,521,141 and as is now common practice with the SUPADRIV recess.

When a driver is used in mass production to drive a large number of identical screws of a size to achieve wedging action, the wedging surfaces at the nose or end of the driver may tend to wear during the first few driving operations to the correct dimensions to achieve effective full depth wedging. This wear does not affect the driving capability of the driver because driving torque is transmitted by the upper parts of the wings, remote from the area which achieves the wedging action.

For the deeper and thus wider recesses for which a wedging action may not be achieved, the greater length of driver which penetrates into the recess and the greater recess width in themselves provide some stability. This stability is assisted by the fact that the nose of the driver still comes very close to being a wedge fit in the grooves and so is confined by the grooves to have very little free movement. This degree of confinement can be increased when torque is applied to the driver because the nose parts of the wings, as well as the upper parts of the wings become angled in the grooves and thereby have less freedom for lateral movement.

I claim:

1. In combination, a rotatable fastener having a driving recess and a driver for engagement in the recess, the recess having four equally circumferentially spaced grooves extending radially outwardly from a central cavity with each groove ending in an outer face which tapers towards the bottom of the recess with the included angle between diametrically opposite end faces being 40°–45° and the driver having four equally circumferentially spaced wings projecting radially from a central core for driving engagement with the grooves with each wing ending in an outer edge face tapering in a radial direction with respect to the core towards an end of the driver with the included angle between diametrically opposite edge faces being 52°, the width of the wings at an upper edge of the recess when the driver is in driving engagement with the recess being less than the corresponding width of the grooves whereby the driver can move angularly about its longitudinal axis in the recess to insure driving contact between driver and recess at the upper outer edges of the recess and wherein the width of the grooves taper towards the bottom of the recess to such an extent that the ends of the wings of the driver are adapted to be wedged in the grooves to provide a stable engagement between driver and fastener.

2. A combination as claimed in claim 1 wherein there is an effective taper in a radial direction between the width of the wings of the driver and the width of the grooves in the recess such that said engagement takes place at the inner edges of the grooves and wings.

* * * * *

UNITED STATES PATENT AND TRADEMARK OFFICE
CERTIFICATE OF CORRECTION

PATENT NO. : 4,464,957
DATED : August 14, 1984
INVENTOR(S) : Peter J. Gill

It is certified that error appears in the above-identified patent and that said Letters Patent is hereby corrected as shown below:

Col. 6, line 13, change "U.S." to --U.K.--

Col. 6, line 44, change "end" to --outer--;

Signed and Sealed this

*Twenty-sixth* Day of *March 1985*

[SEAL]

*Attest:*

DONALD J. QUIGG

*Attesting Officer*   *Acting Commissioner of Patents and Trademarks*